United States Patent [19]
Knopka

[11] 3,874,157
[45] Apr. 1, 1975

[54] FLAME-RETARDANT FIBER BLEND

[75] Inventor: William N. Knopka, Wilmington, Del.

[73] Assignee: FMC Corporation, Philadelphia, Pa.

[22] Filed: Aug. 3, 1973

[21] Appl. No.: 385,573

Related U.S. Application Data

[63] Continuation-in-part of Ser. No. 328,043, Jan. 30, 1973, and a continuation-in-part of Ser. No. 328,044, Jan. 30, 1973.

[52] U.S. Cl............ 57/140 BY, 260/9, 260/47 R, 260/75 R, 260/75 H, 260/860
[51] Int. Cl............................................. D02g 3/04
[58] Field of Search........ 57/140 R, 140 BY, 140 C, 57/157, 157 R; 260/9, 16, 45.75 R, 45.9 R, 260/47 R, 47 C, 49, 75 R, 75 H, 75 S, 860

[56] References Cited
UNITED STATES PATENTS

| | | | |
|---|---|---|---|
| 3,110,547 | 11/1963 | Emmert | 260/75 H |
| 3,265,762 | 8/1966 | Quisenberry | 260/860 |
| 3,480,582 | 11/1969 | Brooks | 57/140 BY |
| 3,483,157 | 12/1969 | Smith et al. | 260/860 |
| 3,558,557 | 1/1971 | Hrach et al. | 260/47 C |
| 3,572,397 | 3/1971 | Austin | 57/140 BY |
| 3,732,683 | 5/1973 | Feller | 57/140 R |
| 3,744,534 | 7/1973 | Henry et al. | 57/140 BY |
| 3,763,644 | 10/1973 | Jackson et al. | 260/75 R |
| 3,775,374 | 11/1973 | Wolfe | 260/75 H |
| 3,794,617 | 2/1974 | Mains et al. | 260/47 C |

Primary Examiner—John Petrakes

[57] ABSTRACT

Flame-retardant yarns and fabrics of a combination of (1) fibers of a polyester resin of at least 75 mol percent of ethylene-2, 6-naphthalene dicarboxylate units and at least 3 up to 25 mol percent of randomly copolymerized ester units having bromine or chlorine chemically united with the diol residue of said ester units and (2) flame-retardant cellulosic fibers.

11 Claims, No Drawings

FLAME-RETARDANT FIBER BLEND

This application is a continuation-in-part of copending applications Ser. Nos. 328,043 and 328,044, both filed Jan. 30, 1973.

It is known that polyester resins have a high carbon content and are quite flammable. They can be rendered flame-retardant by incorporating inorganic and organic materials therein, especially those containing bromine, chlorine, phosphorous, antimony, zinc and alumina. The main drawback of these systems is the adverse effects they have on fibers produced therefrom, since appreciable quantities of flame-retardant agents are required to promote the required level for flame-retardance. As a result, these materials can render the fiber brittle or, in other ways, affect the usually outstanding physical properties of the polyester. Another disadvantage to the additive approach is the fact that such additives can be easily leached out or removed during normal laundering and dry cleaning, causing an adverse effect on the flame-retardancy of the fabric.

An alternate method to improve the flame-retardancy of a polyester resin is the incorporation of a comonomer which contains one or more of the elements that are known to impart flame-retardancy. The major disadvantage of this approach is that the molar concentration of the comonomer, which is required to achieve the desired level of flame-retardance, is generally so high that the resultant resin manifests physical properties not usually associated with polyester. For example, a large proportion of comonomers would lower the melting point and, as a result, limit the utility of the polyester. Likewise, certain comonomers lower the crystallinity of the polymer, producing amorphous polymers which are incapable of producing commercially suitable textile fibers. If a flame-retardant copolyester could be produced with good physical and thermal properties, it would receive widespread acceptance for the manufacture of shaped articles.

The need for a polyester fiber which has good physical properties and high flame-retardancy is most critical for yarn and fabric blends of polyester fibers and cellulosic fibers. Polyester fibers are thermoplastic and when exposed to a flame, burn and melt away from the flame, thus extinguishing themselves. If polyester fibers are blended with flammable cellulosic fibers and exposed to a flame, the polyester is more likely to continue burning even when melting since the burning cellulose fiber continuously ignites it. If polyester fibers are blended with flame-retardant cellulosic fibers and the blend ignited, the flame-retardant cellulosic fibers burn only in the area of flame contact. However, the flame-retardant cellulosic fiber acts as a scaffold or support and prevents the polyester fiber from dripping away from the flame and the polyester continues to burn.

It is a primary object of this invention to provide a flame-retardant polyester resin suitable for the formation of fibers which will meet more stringent flame-retardant test requirements while maintaining good fiber physical properties.

It is another object of this invention to provide a flame-retardant fiber blend of a flame-retardant polyester fiber and a flame-retardant cellulose fiber which fiber blend has good physical properties.

It is still another object of this invention to provide fabrics having good permanent flame-retardancy and good physical properties which fabrics are prepared from polyester fibers and cellulosic fibers.

These and other objects are accomplished in accordance with this invention which comprises a linear, filament-forming random copolyester resin of at least 75 mol percent of ethylene-2,6-naphthalene dicarboxylate units and at least 3 mol percent up to 25 mol percent of a copolymerized ester unit having bromine or chlorine chemically united with the diol residue of said ester units in an amount sufficient to provide at least 3.5 percent of the halogen, based on the weight of the copolyester resin.

The ethylene-2,6-naphthalene dicarboxylate unit of this invention has the following structural formula:

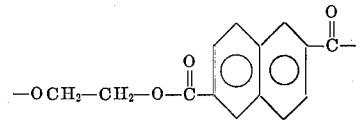

The halogenated ester unit for this invention has the following general formula:

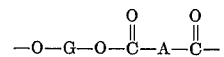

where G is the residue of a saturated diol or functional equivalent thereof, A is the residue of a saturated dicarboxylic acid or functional equivalent thereof and G is substituted with one or more halogen atoms including either bromine, chlorine or both. The functional equivalents of the diol include, for example, epoxides or lower acid esters, e.g., acetic acid esters, and the functional equivalents of the dicarboxylic acid include, for example, carbonyl halides, anhydrides, salts and esters of lower alcohols. These functional equivalents for diols and dicarboxylic acids and their reactivity in forming ester units, as generally described above, are well-known and need not be described in further detail.

At least G is a polyvalent organic radical depending principally on the number of halogen atoms attached thereto. These radicals are preferably hydrocarbon and more preferably aromatic hydrocarbon radicals but generally include aliphatic, substituted aliphatic, cycloaliphatic including heterocyclic radicals, aromatic and substituted aromatic radicals. These radicals may have various atoms, other than carbon, as an integral link in the radical chain or as substituents including, for example, chalcogens, nitrogen and phosphorus. In addition, various substituent and linking groups may be present in the organic radical including, for example, sulfonic acid groups, sulfinic acid groups, phosphonic acid groups, phosphinic acid groups, salts of these acid groups, imide groups, amide groups, amine groups and the like. In a preferred aspect of this invention the diol portion of the halogenated ester unit is derived from a diol having the following general formula:

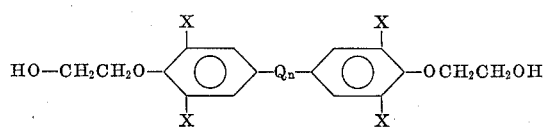

wherein X is bromine or chlorine, Q is $-SO_2-$, $-O-$, or

wherein R and R' are the same or different radicals including hydrogen, and alkyl radical having from 1 to 6 carbon atoms or an aromatic radical, and n is zero or one; and the dicarboxylic acid portion contains a phenylene or naphthalene base radical.

Examples of compounds which may be used to provide the diol portion of the halogenated ester units are set forth below:
2,2-dimethyl-1,3-propandiol
2,2,3,3-tetramethyl-1,4-butandiol
2-buten-1,4-diol
2-hexen-1,6-diol
3-octen-1,8-diol
2,2,5,5-tetramethyl-3-hexene-1,6-diol
diethylene glycol
triethylene glycol
tetraethylene glycol
dipropylene glycol
4,4'-dihydroxy-dibutyl ether
2,2-sulfonyl diethanol
4,4'-sulfonyl dibutanol
3,3'-[sulfonyl bis-(3-propyl sulfonyl)]dipropanol
4,4'-[1,4-butylene disulfonyl bis-(4-butyl sulfonyl)]-dibutanol
6,6'-(1,6-hexylene disulfonyl)dihexanol
sulfonyl bis-[3-(2,2-dimethyl)propanol]
hydroquinone
p-xylylene glycol
3,6-bis-(hydroxymethyl)durene
4,4'-bis-(hydroxymethyl)biphenyl
2,6-bis-(hydroxymethyl)naphthalene
1,5-bis(γ-hydroxypropyl)naphthalene
1,4-bis-(β-hydroxyethyl)benzene
2,2'-(p-phenylenedioxy)diethanol
3,3'-(p-phenylenedioxy)dipropanol
3,3'-(p-xylylenedioxy)dipropanol
4,4'-(p-phenylenedisulfonyl)dibutanol
(1,5-naphthalene disulfonyl)dimethanol
1,4-cyclohexane dimethanol
1,4-cyclohexane-β,β'-diethanol
1,4-cyclohexane-δδ-dibutanol
1,4-cyclohexanedioxy-β, β'-diethanol
1,4-cyclohexane disulfonyl-β,β'-diethanol
β, β,β'β'-tetramethyl-2,4,8,10-tetraoxaspiro-(5.5)-undecane-3, 9-diethanol
bis-(p-hydroxyphenyl)methane
1,1-bis-(p-hydroxyphenyl)ethane
2,2-bis-(p-hydroxyphenyl)propane
1,1-bis-(p-hydroxyphenyl)cyclohexane
bis-(p-hydroxyphenyl)phenylmethane
bis-(o-carboxyphenyl)-1,2-dioxyethane
bis-(p-hydroxyphenyl)sulfone
1,4-bis-(β-hydroxyethoxy)-2,5-ditertiary-butyl benzene The diol compounds may also be used in the form of functional equivalents of diols, as previously stated, and are halogenated with bromine or chlorine to provide the halogenated portion of the ester units. Where compounds having olefin unsaturation are mentioned, such as 2-buten-1,4-diol, halogenation provides saturated compounds.

Some preferred examples of halogenated diols or functional equivalents include:
2,2-bis [4-(β-hydroxyethoxy)-3,5-dichlorophenyl]propane
2,2-bis [4-(β-hydroxyethoxy)-3,5-dichlorophenyl]butane
3,3-bis [4-(β-hydroxyethoxy)-3,5-dibromophenyl]pentane
5,5-bis [4-(β-hydroxyethoxy)-3,5-dibromophenyl]nonane
bis [4-(β-hydroxyethoxy)-3,5-dichlorophenyl]methane
bis [4-(β-hydroxyethoxy)-3,5-dibromophenyl]methane
bis [4-(β-hydroxyethoxy)-3,5-dichlorophenyl]sulfone
bis [4-(β-hydroxyethoxy)-3,5-dibromophenyl]sulfone
bis [4-(β-hydroxyethoxy)-3,5-dichlorophenyl]ether
bis [4-(β-hydroxyethoxy)-3,5-dibromophenyl]ether
bis [4-(β-hydroxyethoxy)-3,5-dibromophenyl]diphenyl methane
4,4'bis(β-hydroxyethoxy)-3,3',5,5'tetrabromobiphenyl
3,3',5,5'-tetrabromo bisphenol-S-diacetate Other examples of halogenated diols or their functional equivalents have the following general formulas:

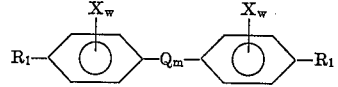

wherein X is bromine or chlorine and $w$ is 1–4; Q is a divalent saturated aliphatic hydrocarbon radical having from 1 to 6 carbon atoms, a divalent saturated cycloaliphatic hydrocarbon radical of 5 to 7 carbon atoms, —O—, —CO—, —S—, —S—S— or —SO$_2$—; m is zero or one and R$_1$ is

wherein R$_2$ is an alkyl or aromatic group, or —O(CH$_2$CH$_2$O)$_b$H wherein b is 1, 2, 3 or 4.

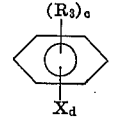

wherein R$_3$ is —OCH$_2$CH$_2$OH or

wherein R$_4$ is a lower alkyl radical, c is 1 or 2, preferably 2, X is bromine or chlorine and d is 1–4, preferably 2 or 4.

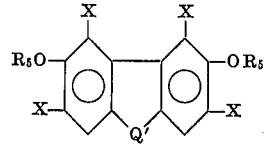

wherein X is bromine or chlorine and $R_5$ is —H, $+CH_2CH_2O+_eH$ wherein e is 1 or 2 or

wherein $R_6$ is a lower alkyl radical and Q' is —$SO_2$— or —O—.

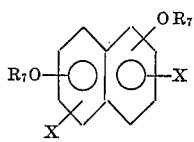

wherein $R_7$ is —H, $+CH_2CH_2O+_fH$ wherein f is 1 or 2, or

wherein $R_8$ is a lower alkyl radical, and X is bromine or chlorine.

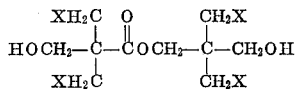

wherein X is bromine or chlorine.

The use of trifunctional or higher polyfunctional hydroxy compounds such as glycerine, pentaerythritol and trimethylol propane as ester components must be avoided or limited to very small amounts to prevent or minimize cross-linking of the polymer chains.

Examples of compounds which may be used to provide the dicarboxylic acid portion of the halogenated ester units are set forth below:
oxalic acid
adipic acid
pimelic acid
suberic acid
azelaic acid
sebacic acid
succinic acid
malonic acid
brassylic acid
glutaric acid
2,3-dimethyl glutaric acid
methyl succinic acid
methyl malonic acid
p-cyclohexane dicarboxylic acid
p-1,4-endomethylene cyclohexane dicarboxylic acid
terephthalic acid
isophthalic acid
orthophthalic acid
2-methyl terephthalic acid
4,4'-methylene dibenzoic acid
4,4'-benzophenone dicarboxylic acid
4,4'-diphenic acid
4,4'-dicarboxy diphenyl ether
1,2-di(p-carboxyphenyl)-ethane
1,2-di(p-carboxyphenoxy)-ethane
2,6-naphthalene dicarboxylic acid
2,7-naphthalene dicarboxylic acid
2,5-norcamphane dicarboxylic acid
2,7-spiro(4.4)nonane dicarboxylic acid
2,6-spiro(3.3)heptane dicarboxylic acid
2,4,8,10-tetraoxaspiro(5.5)undecane dicarboxylic acid
p,p'-sulfonyl dibenzoic acid
p-carboxycarbanilic acid
bis-(p-carboxyphenyl)phosphinic acid salt These dicarboxylic acid compounds may be used as their functional equivalents, as previously mentioned. The dicarboxylic acids may be reacted directly with the diols to form the ester unit or low polymer thereof or the dicarboxylic acid may be used in the form of its lower dialkyl ester and reacted with the diol to provide the halogenated ester by means of an ester-interchange, as is well-known in this art.

In addition to the diacid and diol compounds which are used to form the halogenated ester units, monofunctional organic acids and alcohols may be used as end groups for the copolyester chains. The monofunctional halogenated alcohols are generally used in combination with difunctional halogenated comonomers in order to obtain the desired halogen content in the copolyester resin.

Still further, difunctional compounds which contain both a single carboxyl group and a single hydroxyl group may be employed as ester linking compounds. Examples of this type of compound are illustrated in the following general formula:

wherein R is —H,

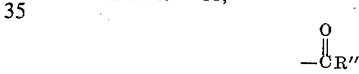

wherein R'' is a lower alkyl radical, or —$CH_2CH_2OH$, R' is —H or lower alkyl radical.

The halogenated ester unit of this invention is randomly situated in the copolyester molecule chain. For the purpose of this invention, the term "random" includes those copolyesters which have small blocks of halogenated ester units randomly positioned in the chain. Thus, up to about 5 halogenated ester units of the same or similar structure can be linked together and positioned in the high molecule chain.

As previously stated, the halogenated copolyester of this invention contains bromine or chlorine chemically united therewith in an amount sufficient to provide at least 3.5 percent of the halogen, based on the weight of the copolyester. Preferably, there is at least 5 percent of the stated halogen present. The amount of halogen which can be present depends on the number of halogen atoms attached to the halogenated ester unit and the number of ester units up to 25 mol percent, in the copolyester chain. The percent of halogen present will also relate to the molecular weight of the halogenated ester unit.

The copolyester resin can contain up to 10 mol percent of other interpolymerized, non-halogenated, ester units as is well-known in this art to vary the properties of the resin as desired without deleteriously affecting the flame-retardant properties of the resin. It should be understood that, in any case, the amount of ethylene 2,6-naphthalene dicarboxylate units should not be less than 75 mol percent of the copolyester. Other ester units, which may be interpolymerized constituents of the copolyester chain in an amount up to 10 mol percent are well-known in the art and are usually derived from other diacids and diols such as previously described. Some specific examples of these non-halogenated diacids and diols include terephthalic acid, isophthalic acid, bibenzoic acid, sodium sulfoisophthalic acid, sodium sulfoalkoxyisophthalic acid, diphenyl sulphone dicarboxylic acid, malonic acid, glutaric acid and the like; alkylene glycols having from 3 to 12 carbon atoms, gem-dialkyl glycols, bis(hydroxymethyl) cyclohexane, diethylene glycol and the like.

The copolyester resins of this invention are conventionally prepared by reacting the major diacid and diol components with a halogenated diol to obtain a high molecular weight polycondensation product. The transesterification method is a preferred technique for obtaining the copolyesters. This employs the lower alkyl diesters of the diacids with one or more diols in an ester interchange reaction. The glycol diester or low molecular weight polymer thereof is then polycondensed to a filament-forming copolyester resin. Transesterification and/or polycondensation catalysts along with elevated temperature and varied pressure conditions are employed, as is well-known in this art. In the direct method for preparing copolyester resins, the diacid and diol components are reacted directly in the first stage and thereafter the product is polycondensed to provide the high molecular weight resin. Suitable catalysts along with elevated temperature and varied pressure are employed, as is well-known in the art.

As an alternative procedure, a functional halogenated diol can be reacted (polycondensed) with a low molecular weight polymer or prepolymer of ethylene-2,6-naphthalene dicarboxylate prior to completion of the polyester synthesis to provide the filament-forming resin.

The copolyester resins of this invention are those having an intrinsic viscosity of at least about 0.15 and preferably at least about 0.35 as determined in a 60 weight percent phenol and 40 weight percent tetrachloroethane solution at 30°C.

The copolyester resin described herein can have various additives incorporated therein to improve the resin properties. For example, heat, oxidation and ultraviolet light stabilizers, antistatic agents, plasticizers, dyes, pigments and the like can be employed.

Additionally, a metal compound from the group consisting of antimony oxides, e.g., antimony trioxide; antimony salts of α-hydroxycarboxylic or α, β-dicarboxylic acid (see Ger.Off. 2121186), zinc oxide, alumina and mixtures thereof can be mixed into the copolyester resin to provide additional improvement in flame-retardant properties. The metal compound is present in an amount such that the metal is present in an amount of from about 0.5 to about 5 percent, based on the weight of the resin.

While the resin of this invention can be formed into various shaped articles including filaments, bands, sheets and molded articles, it is especially useful when formed into textile fibers and yarns. These fibers are used, for example, to prepare flame-retardant clothing, carpets and draperies.

Fibers or filaments are usually formed by melt extrusion of the resin composition through a multihole spinneret in a conventional manner. The as-spun yarn is then conventionally oriented to produce textile yarn of the continuous filament or staple fiber type.

This invention comprises a mixture of fibers of the flame-retardant copolyester resin described herein and flame-retardant cellulosic fibers, especially those having permanent flame-retardant properties. Mixtures or blends of these flame-retardant copolyester fibers and flame-retardant cellulosic fibers provide textile fabrics having the highly desirable wear characteristics of polyester textiles with the highly desirable comfort characteristics of cellulosic material.

Flame-retardant cellulosic fibers preferably include cotton, rayon or cellulose acetate fibers which have been combined, impregnated or coated with flame-retardant chemicals which provide substantially permanent flame-retardant properties therefor without degrading the physical properties of the fiber. That is, the cellulosic fibers or fabrics produced therefrom should be capable of withstanding periodic washing or cleaning with conventional dry cleaning solvents without losing much of their flame-retardant properties. Many flame-retardant treatments for cellulosic fibers are known and several have been found to produce substantially permanent flame-retardancy. It is preferred, in the case of artificially prepared cellulosic fibers such as rayon and cellulose acetate, that the flame-retardant chemical be incorporated into the cellulosic spinning solution thereby providing cellulosic fibers having the flame-retardant "locked in" the cellulosic matrix. Examples of the preparation of these types of cellulosic fibers are found in U.S. Pat. Nos. 2,816,004, 3,266,918, 3,321,330, 3,455,713, 3,556,825, 3,645,936 and 3,704,144.

One preferred form of this invention involves the use of the flame-retardant regenerated cellulose filaments or fibers described in U.S. Pat. No. 3,455,713. These fibers have been found to have excellent physical properties and permanent flame-retardancy. In brief, they are regenerated cellulose filaments having dispersed therein a substantially water-insoluble, liquid phosphonitrilate polymer having the general formula:

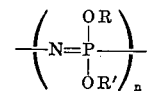

wherein R and R' are the same or different alkyl or alkenyl radicals having from one to six carbon atoms and n is an integer of at least three.

These filaments are preferably prepared by incorporating a flame-retarding amount of the phosphonitrilate polymer in filament-forming viscose, and spinning and regenerating filaments.

In another aspect of the invention, the flame-retardant cellulosic fibers are cellulose acetate fibers prepared by incorporating flame-retardant amounts of compounds such as tris-(2,3-dibromopropyl) phosphate or similar compounds as disclosed in U.S. Pat. No. 3,321,330 into the acetate spinning dope and wet or dry spinning the fibers. Preferably, such compounds are used in amounts ranging from about 2 to about 15 percent, based on the weight of the cellulose acetate.

In general, fiber blends of this invention will contain from about 10 to 90, preferably 20 to 80 weight percent copolyester fibers and 90 to 10, preferably 80 to 20 weight percent of cellulosic fibers.

The blended or combined flame-retardant copolyester and cellulosic fibers are used in various fiber and fabric constructions including, for example, spun staple yarns, mixed or tangled continuous filament yarns, novelty yarns, knit, woven and non-woven fabrics.

The flame-retardant fibers described herein can also be blended with or combined in a fabric with normally flame-retardant fibers including, for example, glass fibers, polyvinyl chloride fibers, asbestos fibers, metal fibers, modacrylic fibers such as those having the trademark DYNEL and VEREL, and aromatic ring polyamide fibers such as that having the trademark NOMEX. Fiber and fabric blends can, of course, comprise more than one of the other known flame-retardant fibers with the flame-retardant fibers of this invention.

It is realized that blends of copolyester fibers and cellulosic fibers have been treated, usually in the form of a fabric, with flame-retardant chemicals to provide flame-retardant material. However, this approach does not usually provide fabrics which will retain their flame-retardant properties after many washings or dry cleaning treatments. Furthermore, such aftertreatments tend to stiffen the fabrics to an undesirable extent.

The following examples are set forth to demonstrate this invention.

EXAMPLE I

Filament-forming random copolyester resins were prepared by first reacting varying amounts of 2,2-bis[4-(β-hydroxy-ethoxy)-3,5-dibromophenyl] propane with dimethyl-2,6-naphthalene dicarboxylate and ethylene glycol under transesterifying conditions to form prepolymers. The prepolymers were polycondensed sufficiently to form resins. In one of the resin preparations, antimony trioxide was mixed into the melt before cooling to further enhance the flame-retardant properties of the resin.

The copolyester resins were first evaluated for flame-retardancy by grinding the resin sufficiently for the resulting particulate to pass through a 10 mesh screen and pressed into plaques 1/32 inch × 5 ½ inch × 5 ½ inch. The plaques were prepared as follows: A chrome plated brass plate is placed in a Carver Press; a sheet of 6 ½ inch × 6 ½ inch Teflon coated aluminum foil is placed on the brass plate, followed by a 6 inch × 6 inch × 1/32 inch spacer with inside dimensions of 5 ½ inch × 5 ½ inch. A 6 gram sample of the polymer to be evaluated is spread evenly inside the spacer. Next, a 5 ½ inch × 5 ½ inch square of fiberglass fabric is placed on the resin powder. Another 6 grams of resin is spread on the top surface of the fiberglass, followed by another sheet of Teflon coated foil and a second chrome plated brass plate. The press platens (previously heated at 270°C.) are slowly closed to the point where they just begin to touch the top chrome plate. After 3 minutes, the platens are tightly closed and the pressure raised to 10,000–12,000 p.s.i.g. After 1 minute, the pressure was released and the laminate quenched in a cold bath. The resultant plaques were cut into ½ inch × 5 ½ inch strips and evaluated in the Standard Method of Test for Flammability of Plastics using the Oxygen Index Method, ASTM-D-2863-70, commonly called the LOI test. The higher the LOI number, the better the flame-retardant property of the resin.

Results of testing the various resins with this test procedure are reported in the following Table:

TABLE I

| Sample No. | Br.,%* | Sb,%** | LOI | I.V. | M.P. °C. |
|---|---|---|---|---|---|
| 1 | 0.00 | — | 28 | 0.42 | 265 |
| 2 | 5.38 | — | 36 | 0.33 | 241 |
| 3 | 9.88 | — | 37.2 | 0.19 | 234 |
| 4 | 15.10 | — | 40.4 | 0.41 | 227 |
| 5 | 15.10 | 0.72 | 47.6 | 0.34 | 264 |

* Percent bromine (from brominated comonomer) based on the weight of the resin.
** Percent antimony (from antimony trioxide) based on the weight of the resin.

Plastic articles having an LOI number of at least 30 are generally regarded as highly flame-resistant and self-extinguishing. Sample No. 1 of TABLE I was a homopolymer of ethylene 2,6-naphthalene dicarboxylate units. It can be seen from the above table that the copolyester resins disclosed herein have excellent flame-retardant properties. The increase in the LOI from Sample No. 1 to Sample No. 2 is unexpectably high. As the amount of the comonomer is increased, the amount of bromine in the polymer also increases and provides an additional flame-retardancy. The addition of antimony to the copolyester resin provides even greater flame-retardancy as seen in Sample No. 5 of TABLE I.

EXAMPLE II

Copolyester resins of terephthalic acid, ethylene glycol and 2,2-bis[4-(β-hydroxyethoxy)-3,5-dibromophenyl]propane, were prepared with varying amounts of the halogenated comonomer for flame-retardant testing as described in EXAMPLE I. The results of these LOI tests and polymer properties are set forth in the following table:

TABLE II

| Sample No. | Bromine, % | LOI | I.V. |
|---|---|---|---|
| 1 | 0.00 | 20.0 | .62 |
| 2 | 3.03 | 22.9 | .43 |
| 3 | 6.11 | 24.7 | .59 |
| 4 | 11.9 | 27.5 | .50 |

Sample No. 1 of TABLE II is a homopolymer of ethylene terephthalate units. It can be seen from the table that the LOI rating for the homopolymer is quite low. When a copolyester resin of ethylene terephthalate units and brominated comonomer units was tested, it also had a relatively low and only slightly improved LOI rating. Higher amounts of brominated comonomer continued to improve the LOI rating but still did not produce results comparable to those shown in TABLE I.

EXAMPLE III

A copolyester of 2,6-naphthalene dicarboxylic acid, ethylene glycol and 2,2-bis[β-hydroxyethoxy)-3,5-dibromophenyl]propane was prepared to provide a resin having a bromine content of 9.3 percent by weight (7.7 mol percent of brominated comonomer) in the presence of 0.75 percent antimony (from $Sb_2O_3$). A yarn was prepared from this resin by the conventional melt spinning of fibers. The yarn was drawn at 121°C. at a draw ratio of 5:1 providing a yarn having the following physical properties: tenacity, 3.08 grams per denier; breaking elongation, 31.8 percent; and initial modulus of 63.4 grams per denier. The yarn resin had a glass transition temperature of 110°C., a melting point of 235°C., an intrinsic viscosity of 0.38 and a free carboxyl content of 72 meq./kg. It can be seen from the example that fibers possessing excellent physical properties can be obtained from the copolyester resins of this invention.

EXAMPLE IV

Twenty-four grams (8.6 mol percent) of 2,2-bis[4-($\beta$-hydroxyethoxy)-3,5-dibromophenyl]propane, 112 grams of bis(2-hydroxyethyl)-2,6-naphthalene dicarboxylate, 0.039 gram of antimony trioxide and 0.06 gram of triphenyl phosphite were successively charged into a vertical cone-shaped reactor. The mixture was heated from 220°C. to 225°C. in 60 minutes, while lowering the pressure to 10 mm. of Hg. The pressure was further lowered to 0.6 mm. over an additional 15 minute period. After 2 hours, the polycondensation was finished. The resulting resin was spun into a 10 filament yarn through a spinneret affixed to the reactor bottom. The resulting yarn was drawn at a temperature of 150°C. and at a 6.15:1 draw ratio, and then combined in a conventional manner with a permanent flame-retardant rayon to provide a 50/50 blended yarn. The rayon was prepared in accordance with U.S. Pat. No. 3,455,713 and contained about 15 percent by weight of a water-insoluble, liquid polymer of di-n-propyl phosphonitrilate. The resulting yarn was knit on a Lawson knitting machine into a sleeve weighing 5.69 oz. per square yard. The blended fabric was evaluated in a vertical flammability test as defined by the United States Department of Commerce FF 3-71 (37 F.R. 146424), "Standard for the Flammability of Childrens Sleepwear." The test results are shown in the following Table.

TABLE III

Vertical Flammability Test
(3 second bone dry)

| Burns | |
|---|---|
| (1) | 1 sec. AF[1], 3.75" CL[2] |
| (2-5) | NAF[3], 3.53" CL |

[1]AF = after flame, time indicates sample continued to burn after flame was removed.
[2]CL = char length, the original length of each sleeve was 10".
[3]NAF = no after flame, material failed to burn after the flame was removed.

An analysis of the polyester fiber of this example, before blending, revealed that it contained 10.6 percent bromine, had an intrinsic viscosity of 0.36 and a free carboxyl content of 25 meq./kg.

EXAMPLE V

In a manner similar to that described in EXAMPLE IV 2,2-bis[4-($\beta$-hydroxyethoxy)-3,5-dibromophenyl]propane (6.9 mol percent) was reacted with previously prepared prepolymer made by condensing 2.1 mols of ethylene glycol with 1.0 mol of dimethyl terephthalate. The resultant mixture was polymerized and then spun into a 10 filament yarn. The yarn was drawn at a temperature of 121°C. and at a 3.64:1 draw ratio and then combined in a conventional manner with the flame-retardant rayon described in EXAMPLE IV to provide a 50/50 yarn blend. This yarn was knit on a Lawson knitter and weighed 7.00 oz. per square yard. The fabric blend was evaluated in the vertical flame test in the same manner as described in EXAMPLE IV. The flame-retardant evaluation is shown in the following table.

TABLE IV

Vertical Flammability Test
(3 second bone dry)

| Burn | | |
|---|---|---|
| (1) | NAF[1] | 2.89" CL[2] |
| (2) | NAF | 3.19" CL |
| (3) | NAF | 2.81" CL |
| (4) | NAF | 3.19" CL |

[1]NAF = no after flame - material failed to burn after the flame was removed.
[2]CL = char length; the original length of each sleeve was 10"

An analysis of the polyester fiber of this Example, before blending, revealed that it contained 10.1 percent bromine, had an intrinsic viscosity of 0.47, a free carboxyl content of 15 meq./kg. and contained 0.25 percent diethylene glycol.

TABLE V summarizes the physical properties obtained from the polyester yarns prior to blending as prepared in EXAMPLES III–V. The yarns were processed in each case to obtain the best physical properties.

TABLE V

| Example | Tenacity (g./d.) | Elongation % |
|---|---|---|
| PET[1] control | 3.42 | 39.2 |
| pen-26[2] control | 5.08 | 34.8 |
| III | 3.08 | 31.8 |
| IV | 4.03 | 23.0 |
| V | 1.28 | 21.2 |

[1]PET = Poly(ethylene terephthalate)
[2]PEN-26 = Poly(ethylene-2,6-naphthalene dicarboxylate The data in TABLE V indicates that polyester fibers, obtained from the random copolycondensation of 2,2-bis[4-($\beta$-hydroxyethoxy)-3,5-dibromophenyl]propane with naphthalene-2,6-dicarboxylic acid and ethylene glycol, are unexpectedly superior in physical properties to those obtained from the corresponding copolymer of terephthalic acid and at the same time meet stringent flame-retardant standards. The results shown for the yarns of EXAMPLE V indicate that yarn blends containing yarns prepared from copolyesters of terephthalic acid and 2,2-bis[4-($\beta$-hydroxyethoxy)-3,5-dibromophenyl]propane although sufficient to impart flame-retardance will be physically weaker and the result will not be the outstanding wear performance typically associated with the non-flame-retardant yarn blend.

EXAMPLE VI

The diacetate of 3,3',5,5'-tetrabromo bis-phenol S having the following formula:

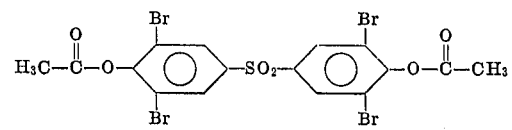

was prepared as follows:

(0.2 mol) 113.18 grams of tetrabromobisphenol S and 10 drops of concentrated sulfuric acid were added to 800 ml. of acetic anhydride. The reaction mixture was refluxed for two hours and filtered hot. The precipitate was dried in a vacuum oven to yield 74.6 g. (57.4 percent) of the product having a melting point of 274°–276°C.

The filtrate was chilled in an ice-water bath yielding another 24.0 g. of the product, m.p. 274°–276.5°C. Recrystallization of the combined material raised the m.p. to 276°–278°C.

Random copolyester resins of 2,6-naphthalene dicarboxylic acid, ethylene glycol and 3,3',5,5'-tetrabromobisphenol S diacetate were prepared with varying amounts of the halogenated comonomer for flame-retardant testing as described in Example I. The results of these LOI tests and polymer properties are set forth in the following Table:

TABLE VI

| Sample No. | Br.%[1] | Sb,%[2] | LOI | IV |
|---|---|---|---|---|
| 1 | 4.48 | 0.743 | 39.7 | 0.48 |
| 2 | 4.66 | 0.654 | 39.0 | 0.50 |
| 3 | 9.35 | 0.574 | 45.4 | 0.29 |

[1]Percent bromine from brominated comonomer based on the weight of the resin.
[2]Percent antimony based on the weight of the resin.
[3]Antimony source is an antimony oxide-silica gel complex containing 25% $Sb_2O_3$, commercially known as SB-25, offered by NL Industries.
[4]Antimony oxide is $Sb_2O_3$.

EXAMPLE VII

Bis-[4-(β-hydroxyethoxy)-3,5-dibromophenyl]sulfone was prepared as follows:

Sodium metal (9.2 g, 0.4 gatom) was reacted with 1 liter of absolute ethanol. After all the sodium metal had reacted, 113.18 g. (0.2 mol) tetrabromobisphenol S was added. The solid dissolved and then reprecipitated. The entire reaction mixture was stripped to dryness upon a rotary evaporator at water aspirator pressure. To the dried residue was added 644.08 g. (8.0 mol) 2-chloroethanol. The reaction mixture was stirred and heated for 3 hours. The reaction mixture was then filtered hot and the precipitate was dried in the oven. The filtrate was cooled and the precipitate which formed was filtered off and dried. A yield of 84.58 g. (77.2 percent) was obtained; m.p. 181°–195°C. Two recrystallizations raised the m.p. to 228°–230°C.

The copolyester of ethylene-2,6-naphthalene dicarboxylate and 8.2 mol percent of bis[4-(β-hydroxyethoxy)-3,5-dibromophenyl] sulfone was prepared and evaluated as a flame-retardant composition. The copolyester had an intrinsic viscosity of 0.31; melting point, 249°C; contained 8.07 percent bromine and 0.71 percent antimony ($Sb_2O_3$ was source). Its LOI was 43.0.

Other copolyester resins of at least 75 mol percent ethylene-2,6-naphthalene dicarboxylate units and either brominated or chlorinated ester units are prepared and tested in accordance with the procedures of the foregoing examples and are found to have unexpectedly high flame-retardant properties and, in the form of fibers and fabrics, have excellent physical properties. Brominated ester units are preferred halogenated units because of their ability to provide higher flame-retardancy at lower use levels.

Various changes and modifications may be made in practicing the invention without departing from the spirit and scope thereof and, therefore, the invention is not to be limited except as defined in the appended claims.

I claim:

1. Flame-retardant yarns and fabrics of a combination of (1) fibers of a linear, random copolyester resin of at least 75 mol percent of ethylene-2,6-naphthalene dicarboxylate units and at least 3 mol percent up to 25 mol percent of a copolymerized ester unit having bromine or chlorine chemically united with the diol residue of said ester units in an amount sufficient to provide at least 3.5 percent of the halogen, based on the weight of the copolyester resin and (2) flame-retardant cellulosic fibers, the copolyester fibers being present in an amount of from 10 to 90 weight percent and the cellulosic fibers being present in an amount of 90 to 10 weight percent.

2. The flame-retardant yarns and fabrics of claim 1 wherein the copolyester resin is represented by the general formula:

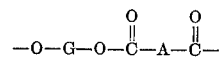

wherein G is the residue of a saturated diol or functional equivalent thereof, A is the residue of a dicarboxylic acid or the functional equivalent thereof, and G is substituted with either bromine or chlorine.

3. The flame-retardant yarns and fabrics of claim 2 wherein G is represented by the general formula:

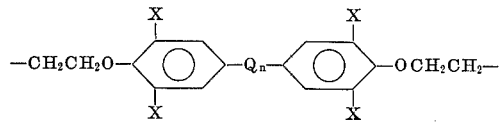

wherein X is bromine or chlorine, Q is $-SO_2-$, $-O-$, or

wherein R and R' are the same or different radicals including hydrogen, an alkyl radical having from 1 to 6 carbon atoms or an aromatic radical, and n is zero or one.

4. The flame-retardant yarns and fabrics of claim 3 wherein X is bromine, Q is

and n is one.

5. The flame-retardant yarns and fabrics of claim 3 wherein X is bromine, Q is $-SO_2-$ and n is one.

6. The flame-retardant yarns and fabrics of claim 2 wherein G is represented by the formula:

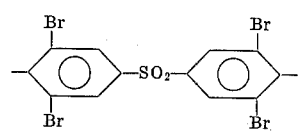

7. The flame-retardant yarns and fabrics of claim 1 wherein the flame-retardant cellulosic fibers are regenerated cellulose.

8. The flame-retardant yarns and fabrics of claim 7 wherein the regenerated cellulose fibers contain a flame-retardant amount of a water-insoluble, liquid polymer of di-n-propyl phosphonitrilate.

9. The flame-retardant yarns and fabrics of claim 1 wherein the flame-retardant cellulosic fibers are cellulose acetate fibers.

10. The flame-retardant yarns and fabrics of claim 9 wherein the cellulose acetate fibers contain a flame-retardant amount of tris-(2,3-dibromopropyl)phosphate.

11. The flame-retardant yarns and fabrics of claim 1 wherein the flame-retardant cellulosic fibers are cotton fibers.

* * * * *

UNITED STATES PATENT OFFICE
CERTIFICATE OF CORRECTION

PATENT NO. : 3,874,157
DATED : April 1, 1975
INVENTOR(S) : William N. Knopka

It is certified that error appears in the above-identified patent and that said Letters Patent are hereby corrected as shown below:

Column 3, line 50, "B.　　B,B'B'" should read --B,B,B'B'--
Column 12, line 31, TABLE V, "pen-$26^2$ control" should read --PEN $26^2$ control--.

Signed and Sealed this seventh Day of October 1975

[SEAL]

Attest:

RUTH C. MASON
Attesting Officer

C. MARSHALL DANN
Commissioner of Patents and Trademarks